Dec. 17, 1963  E. A. HERIDER ETAL  3,114,576
AUTOMOTIVE SEATS
Filed Feb. 17, 1961  2 Sheets-Sheet 1
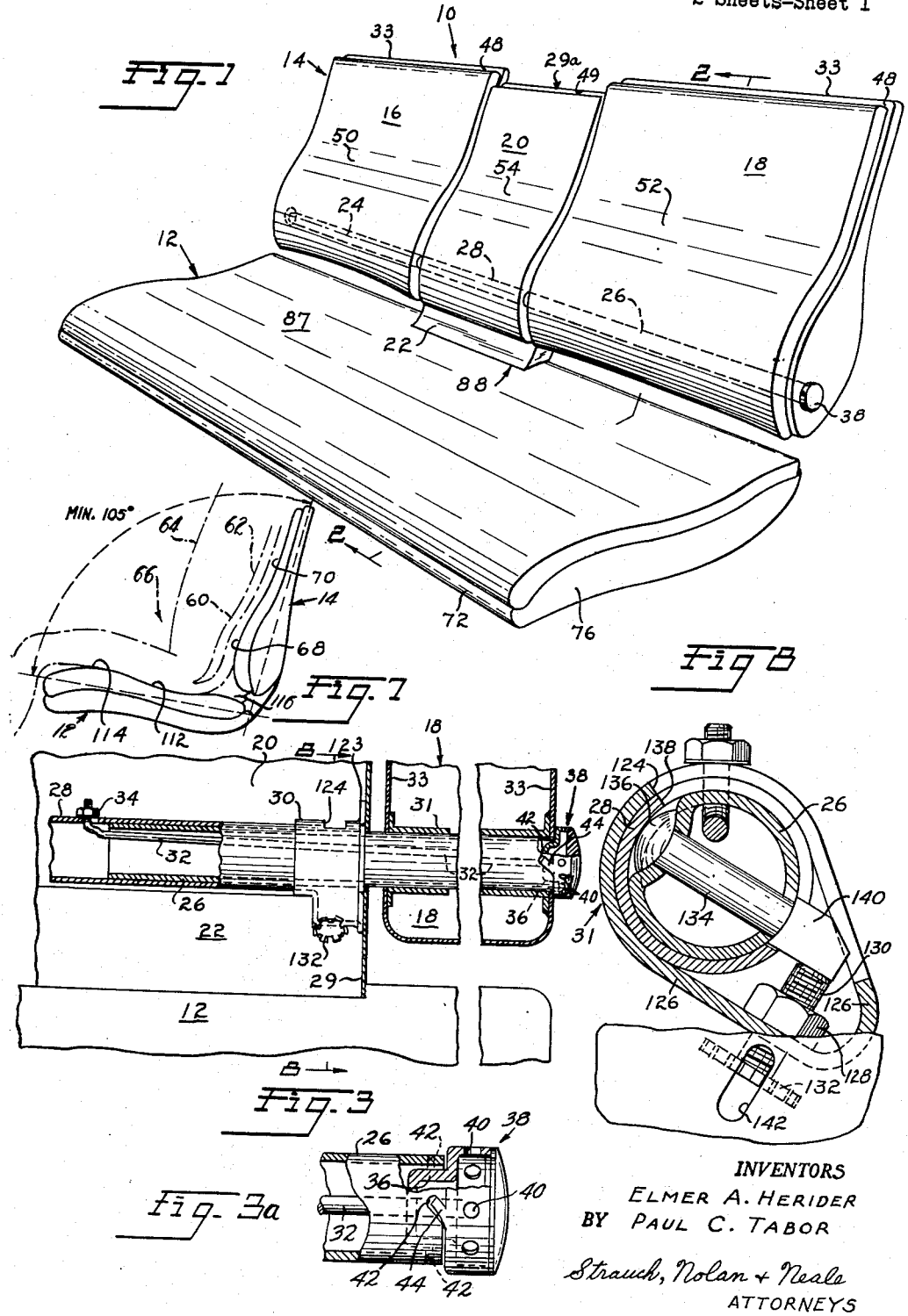
INVENTORS
ELMER A. HERIDER
BY PAUL C. TABOR
Strauch, Nolan + Neale
ATTORNEYS

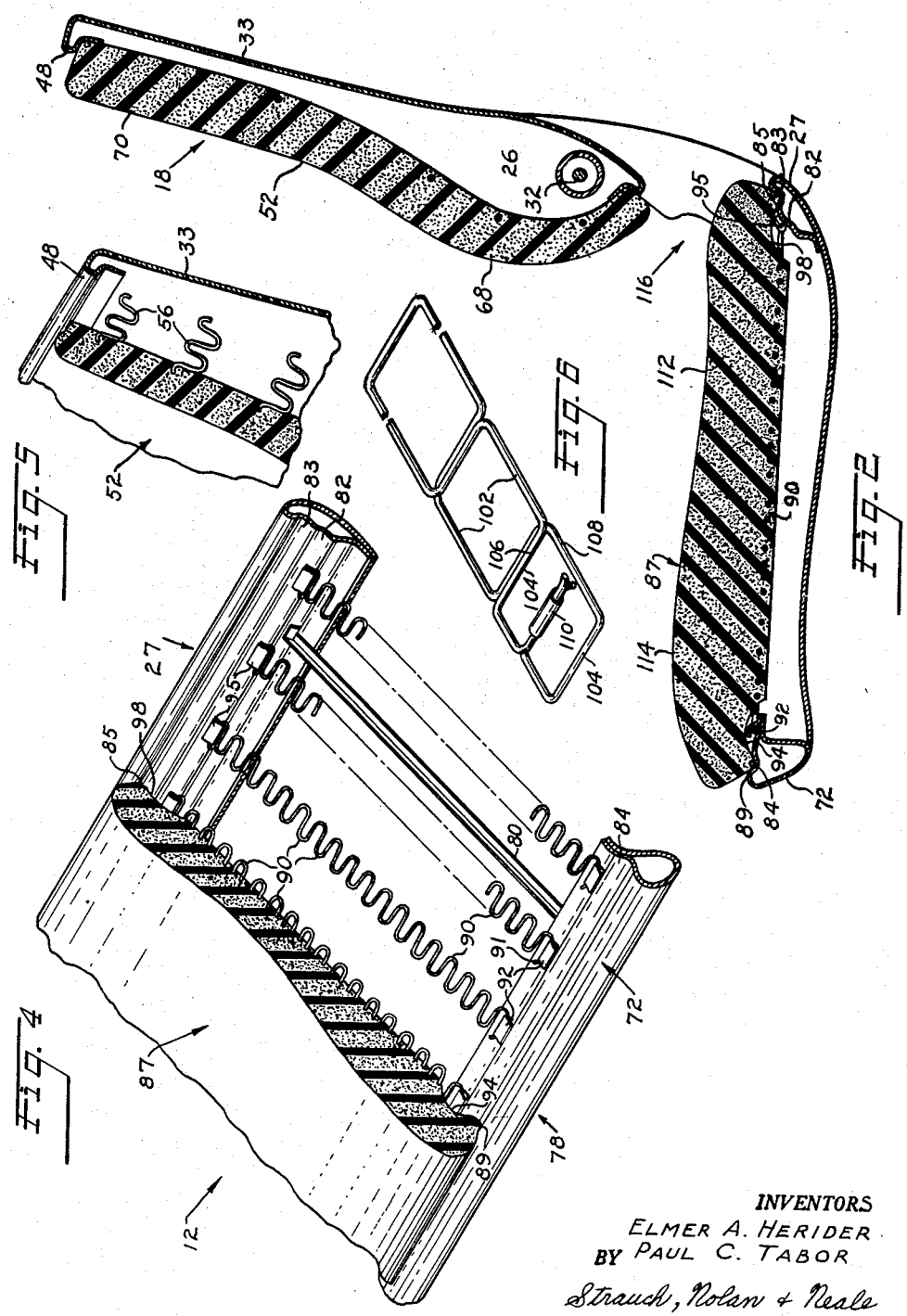

United States Patent Office 3,114,576
Patented Dec. 17, 1963

3,114,576
AUTOMOTIVE SEATS
Elmer A. Herider, Dearborn Township, Wayne County, and Paul C. Tabor, Clawson, Mich., assignors to Rockwell-Standard Corporation, Coraopolis, Pa., a corporation of Pennsylvania
Filed Feb. 17, 1961, Ser. No. 89,945
11 Claims. (Cl. 297—354)

The present invention relates to improvements in automobile seats and more particularly to front seat arrangements having collapsible back rests.

The trend towards automotive designs having a lower silhouette has resulted in the reduction of the interior space available to accommodate seating cushions and seat spring suspension members essential for adequately absorbing road shock and supporting the weight of occupants.

As a result, prior art seat constructions employing nested coil spring elements and heavy padding and upholstering do not meet the requirements in today's modern cars because of their heavy and bulky construction. It has, therefore, become accepted practice to employ longitudinally, flat zig-zag spring elements chiefly because of their small bulk as well as low cost in manufacturing of and ease of assembly into a unit. However, padding and upholstery of those zig-zag spring elements has been rather cumbersome, and the seats are costly due to requirements of several different work operations. Further, the design factor requiring adequate comfort has created an ever increasing problem in view of the diminishing available space.

Another problem has been found to be inherent in the configuration of conventional automotive seats in that they do not conform to the particular posterior of a person and therefore do not provide a comfortable support. It is well known to passengers in an automotive vehicle and more especially to the driver that after having occupied a seat for some time fatigue occurs, particularly around the lower spine section and thigh areas. Most present conventional automotive seats are shaped such that the occupant is forced into a forward slumping position which causes after a while discomfort and sometimes even pain.

It is well known that the lumbo-sacral region of the spine which supports the torso of the body of a person extends in general, at least at its lower portion, along a gentle S-curve and tests preliminary to the concept of the present invention showed that a back rest configuration which conforms in general to the curve of the lumbosacral spinal region provides the most comfortable support and that a minimum angle of 105° between the seat cushion and back rest is required to help preserve the natural lumbar curve of a seated person. It has further been found that for efficient support it is desirable to place the primary back support just above the lowermost lumbar spinal region which is the area where most postural back symptoms are located. The seat cushion instead of merely being flat or slightly convex should also be preferably contoured to provide adequate support for the thighs and buttocks of a person extending from a point adjacent the knee joints rearwardly and designed to preserve the lumbo-sacral spine curve.

In addition thereto, in most conventional automotive seats having forwardly pivoting back rests as employed in two-door automobiles, the back rests are usually hinged at the seat outerside on a bracket, familiarly called a "hockey stick," which pivots the back rest forwardly and inwardly of the automobile to allow rear passengers to enter or exit. There are inherent disadvantages in this construction aside from the cost, weight and assembly problems. The "hockey stick" bracket tends to chafe and ruin the border surface of the seat cushion adjacent to it by its angular sidewise movement. In addition, it is not possible to fold both back rests at the same time—which may be desired occasionally—due to their interference with each other. Such conventional front seat arrangements also do not comfortably seat a third person because of the partition between the two folding back rests.

The present invention contemplates a front seat construction with folding back rests and in which an intermediate independent seat section is provided to comfortably accommodate a third occupant. The outer folding back rests are pivotal supported in cantilever fashion to eliminate the objectionable "hockey stick" construction.

To collectively and individually eliminate the foregoing and other disadvantages of conventional automobile front seats particularly in two-door type vehicles the present invention provides as its primary object an improved, thin-cushioned, posterior shaped seat to comfortably support a person incorporating features to lessen or eliminate fatigue, which are based on the knowledge of anatomical, physiological, and pathological causes of low-back discomfort and pain after a prolonged seating time which are prevalent in conventional automotive seats.

Another object of the present invention is to provide a posture seat cushion support of a new and novel construction.

Another object of the present invention is to provide in automotive seat constructions a contoured seat cushion and independent seat back which surface is contoured as a gentle S-curve to correspond to the lumbo-sacral spine curve of the human body.

Still another object of the present invention is to provide a thin foam-cushioned seat for automotive vehicles having an independent posterior shaped back rest in which the primary back support is located just above the lowermost section of the lumbar spine of a human body to provide the most comfortable support.

A still further object of the present invention is to provide an automotive front seat arrangement with pivotable back rests having an independent intermediate section to accommodate a third passenger.

Another object of the present invention is to provide in thin cushioned automotive front seats cantilever supported back rests.

Another object of the present invention is to provide a seat with cantilever supported pivotal back rests.

Still another object of the present invention is to provide a low-cost, light weight thin-cushioned front seat assembly for motor vehicles having molded posterior shaped polyurethane seat and back rest cushions which can be prefabricated as complete units to facilitate assembly.

Further objects and novel features will readily become evident by the following detailed description in connection with the appended drawings in which:

FIGURE 1 is a perspective view of a vehicle front seat assembly according to the present invention;

FIGURE 2 is an enlarged cross section through one part of the seat substantially as seen along line 2—2;

FIGURE 3 is a still more enlarged sectional view of the back rest pivot assembly partly in cross section;

FIGURE 3A is an enlarged fragmentary view in section showing the torsion rod end connection and adjustment;

FIGURE 4 is a perspective view partly in section of the seat cushion and frame assembly;

FIGURE 5 is a similar perspective view of part of the back rest cushion and frame assembly;

FIGURE 6 shows an alternate spring construction;

FIGURE 7 is a diagrammatic illustration of certain of the more important features of the present invention; and, FIGURE 8 is a section taken along line 8—8 of FIGURE 3.

Referring to FIGURE 1 there is illustrated a vehicle front seat assembly generally indicated at 10 which comprises a unitary seat cushion and frame unit 12 and a three part back rest assembly 14 composed of two outer pivoted independent back rest units 16 and 18 respectively and an intermediate smaller back rest 20. The units 16, 18 and 20 will be described in detail below.

The outer back rests 16 and 18 (best shown in FIGURES 2 and 3) of back rest assembly 14 are independently pivoted and cantilever supported on tubular members 24 and 26 respectively from the center back rest 20. Center back rest 20 is mounted on a support 22 which is welded or otherwise secured to the rear frame member 27 of seat 12. Center back rest 20 is provided with a frame stamping 29a (FIGURE 1) having opposed stamped end sections 29 one of which is shown in FIGURE 3.

Tubular members 24 and 26 are mounted for rotation in support tube 28 which is carried within center back rest section 20 and is non-rotatably secured at each end to stamped end sections 29 by flanged tubular brackets 30 as by welding.

Members 24 and 26 extend outwardly from tube 28 into back rest support members 16 and 18 in a manner similar to cantilever beams. To provide a sufficient bearing surface between tubular members 24 and 26 and back supports 16 and 18 flanged tubular support brackets 31 are rigidly attached as by welding to the back rest side frame stampings 33 of supports 16 and 18 and to tubular members 24 and 26 to non-rotatably support the back rests 16 and 18 on members 24 and 26 respectively. Two torsion rods 32 are bent at their inner ends to extend through the wall of tube 28 and are secured thereto by a nut 34. These torsion rods extend through tubular members 24 and 26. The outer end of each torsion rod 32 is non-rotatably secured to the base 36 of a torque adjuster nut 38. Nut 38 is provided with holes 40 permitting the insertion of a tool for rotation of the nut. The outer ends of tubular members 24 and 26 are provided with a number of slanted recesses 42 therein into which radially extending tangs 44 of the torque adjuster nut 38 extend. The initial tension of torsion rods 32 may be adjusted by rotating torsion adjusting nut 38 to dispose tanks 44 in different slots 42.

Positive stops (FIGURES 3 and 8) are provided which prevent the back rests 16 and 18 from rotating backward in excess of the desired angle of inclination. As the stops are identical only the stop associated with the left back rest 18 will be described.

Bracket 30 is non-rotatably secured to side frame stamping 29 of center back rest 20 by spot welding its flange 123 to the stamping.

Bracket 30 has a cut out 124 therein and an extension 126 to which a welded nut 128 is secured and through which a screw rod 130 having a star wheel 132 secured to its outer end extends. A pin 134 having a head 136 which is seated in a recess formed in member 26 extends through member 26 and through a slot 138 in support tube 28 which is aligned with the slot 124 and the screw rod 130. A planar faced abutment block 140 is connected to the end of pin 134 to abut screw 130 when seat 18 is in its normal upright position.

Manipulation of star wheel 132 by the tip of a screwdriver or the like which may be inserted into center back rest 20 through a slot 142 in center support stamping 29 will adjust the upright position of the back rests 16 and 18.

Cut outs 138 and 124 before mentioned are provided to permit forward vertical swinging movement of the back rests 16 and 18 to a substantially horizontal position against the relatively light force of the torsion bars.

The pin and abutment block also prevent endwise movement of the tubes 24 and 26 and they retain the seat backs 16 and 18 in their proper lateral position.

It will be seen therefore that the present novel back rests support assembly eliminates any need for an exterior support and thereby avoids the use of the conventional "hockey stick" and its many disadvantages.

With reference to FIGURES 2 and 5 the back rests 16 and 18 each comprise a frame stamping 33 having rims 48 which receive and support a contoured cushion 50 and 52. The frame stamping 29a of back rest 20 is formed with a rim 49 (FIGURE 1) which receives and supports a contoured cushion 54 (FIGURE 1). The cushions are preferably made from a resilient material such as polyurethane and contour molded in one piece with a number of transverse longitudinal flat springs 56 embedded therein which may be of the zig-zag or sinuous type and which have ends secured in known fashion to the contoured side rims of the frame stampings. The polyurethane cushion members referred hereinto are preferably of the kind disclosed in the co-pending application of Raymond W. Brown Serial No. 76,649, filed December 19, 1960, and entitled Seat Assembly, and the springs 56 are molded therein a sufficient distance from the surface of the back rests to prevent rupture of the material. Molding the springs into the resilient material effectively prevents chafing and abrasive action of the spring on the upholstery material encountered in conventional cushion assemblies where the upholstering lies on top of the springs. The resilient material, which in this instance is polyurethane foam, adds to the overall resiliency of the cushion and is smooth to adapt itself easily to any compression placed thereupon. It is furthermore known that this material after being compressed even for a prolonged time immediately assumes its initial shape after the pressure is released, thus eliminating projections and indentations found in conventionally upholstered cushions. Because no additional padding is needed except for the cover and because fewer metal springs are incorporated the thickness and weight of the cushions and the entire seat, are considerably reduced as compared to the conventional rather bulky seats.

As stated before, occupants of conventional automotive seats experience after a certain time fatigue which seems to branch out from a locus at the lower lumbo-sacral spine region producing a feeling of discomfort and occasionally even pain. The present seat construction remedies this serious and long known situation. Referring to FIGURE 7 it has been found that the most efficient shape for a seat back rest follows the gentle curve 60 established by the lumbo-sacral spine region 62 of the torso 64 of a seated human body 66. It will be noted that the primary back support is located just above the lower lumbar spine region which assures that practically the entire torso is supported on the back rest and that little or no weight is transmitted through the lowest spine region. To this end back rest cushions 50, 52 and 54 are similarly contoured to provide a convex primary lower lumbar spine back support section 68 which gently flows into an upper straight section which extends well below the lower angles of the scapular and permits an unrestricted placement of the shoulders of a person for a relaxing change of position. The design of the curved section 68 and straight section 70 is such that a condition known as kyphosis is effectively prevented. Kyphosis usually occurs due to the forward slump of the occupant imparted by conventional automotive seats. The seat of the instant invention prevents forward slumping of an occupant and provides adequate support under impact conditions and when deceleration forces act on the occupant during braking of the vehicle.

To provide correct torso support and preserve the lumbar curve it has been found that a minimum angle of 105 degrees (FIGURE 7) between the thighs and torso of the body is necessary. The back rests therefore are supported relative to the seats in such a way as to provide this minimum angle between the thighs and torso of a seated occupant (FIGURE 7).

Referring now to FIGURES 1, 2 and 4 seat unit 12 comprises a front rail 72 and back rail 27 attached together by similar side frame members 76 at each end (FIGURE 1) to form a frame 78. Spaced support bars 80 (FIGURE 4) preferably extend between rails 72 and 27 to reinforce frame structure 78. Back rail 27 is provided with stepped longitudinal rim sections 82 and 83, front rail 72 is provided with a longitudinal rim section which has a groove 84 therein. The back end 85 of cushion 87 is received in the upper stepped rim 83 in back rail 27 and the front end 89 of cushion 87 is received in groove 84 formed in the front rim section. Seat cushion 87 extends over the entire length of the frame 78 (FIGURE 1) and intermediate its ends is recessed at 88 to fit around the intermediate back rest support 22. Recess 88 aids in holding the seat cushion against longitudinal movement.

End portions 89 and 85 form with the bottom surface of cushion 87 front and rear recesses 94 and 98 respectively. Imbedded in cushion 87 which is molded from polyurethane are flat springs 90. Spring 90 (FIGURE 4) extend transversely through cushion 87 and their ends 91 extend outwardly from the cushion at recesses 94 and 98. The ends 91 of springs 90 are attached to the front and rear rails 72 and 27 respectively by connectors 92 and 95 to thereby resiliently support cushions 87.

It will be seen therefore that recesses 94 and 98 perform at least two functions. (1) They facilitate the attachment of the ends 91 of springs 90 to connectors 92 and 95. (2) They permit the ends 89 and 85 of cushion 87 to seat respectively in groove 84 in front rail 72 and in groove 83 in rear rail 27 without interference by the bent up connector members 92 and 95.

A modification of spring 90 is shown in FIGURE 6. Spring 100 therein shown is made from one piece of round wire which is alternately bent at 90 degrees to provide alternate longitudinal bars 102 and transverse bars 104, bent at its approximate center to provide an upper rod 106 and lower row 108 which overlap each other and the ends of both rows are then fastened together by a clip 110. The spring thus provided affords a durable resilient support yet is free to deflect a maximum amount to thereby automatically adjust to the varying posteriors and weights of different human beings without over deflecting.

In order to cooperate with the posterior contoured back rests 16, 18 and 20 the seat cushion 87 is likewise contoured as shown in FIGURES 1, 2 and 7 to provide a rear concave section 112 which smoothly blends into a raised convex section 114 in the front portion of the seat. The concave section 112 is adapted to support the buttocks of the human body whereas the convex portion 114 gives a firm support for the underside of the legs—as illustrated in FIGURE 7—to and adjacent the knee joints.

Also as space 116 is provided between seat 87 and the back rests an opening exists in the vicinity of the lower spine section which assures constant contact of a human body with the lower lumbar back support 68 which, together with the contoured seat cushion and minimum back rest angle of 105 degrees assures the most comfortable position which includes preservation of the gentle lumbo-sacral curve as illustrated in FIGURE 7.

Thus, a relatively firm support for a human body from adjacent the knees to the buttocks and thighs is provided to establish the most comfortable support for the torso.

Further, the seat cushion assembly is a one piece unitary molded structure requiring no additional springs or padding, the seat, therefore, can be held to a minimum thickness reducing weight and cost.

From the foregoing it will be evident to one skilled in the art that the instant invention provides an exceptionally comfortable, cushioned, posterior contoured vehicle seat which prevents early fatigue and provides adequate support to an occupant and is particularly adapted for use in automotive vehicles of low body construction.

The back rests are supported from the center of the seat in cantilever fashion to be pivoted forwardly in a plane normal to the seat so that both back rests may be pivoted simultaneously without interference.

The back rests and seat cushions are conveniently molded from polyurethane with flat sinuous spring strips imbedded therein to provide unitary prefabricated units which greatly facilitate assembly of the seat.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an automobile seat, a back rest comprising a central back rest member, outside back rest members disposed on each side of said central back rest member, and means cantilever supporting said outside back rest members one on each side of said central back rest member for pivotal movement about a horizontal axis.

2. A three-piece back rest comprising: a central back rest; a central horizontal tubular member rigid with said central back rest; spaced outside back rests; horizontal tubes rigid with the respective outside back rests, said tubes extending into said tubular member in said central back rest to provide cantilever support for said outside back rests.

3. A vehicle seating assembly comprising a frame; a seating cushion resiliently supported on said frame; a three-piece back rest cooperating therewith; said three-piece back rest comprising: a central back rest member, spaced back rest members, means supporting said spaced back rest members in cantilever fashion at each side of said central back rest member, the surface of said back rest being contoured to form a planar surface at the top thereof which merges smoothly into a convex curve at the bottom thereof and said cushion having a concave surface at the rear thereof and a convex surface at the front thereof whereby said seat and back rest interact to support the shoulders, the spine, the buttocks, and the thighs of a person seated thereon.

4. In a vehicle seat capable of seating a plurality of occupants in side-by-side relationship, a multi-piece back rest comprising: a pair of spaced apart outer back rest units, a central support unit disposed between said outer back rest units, and means cantilever supporting each of said outer back rest units on said central unit for pivotal movement about a substantially horizontal axis.

5. The vehicle seat defined in claim 4 wherein said means comprises a torsion rod assembly yieldably resisting forward pivotal movement of each associated outer back rest unit.

6. The vehicle seat defined in claim 5 wherein said torsion rod assembly comprises a pair of telescoping relatively rotatable tubular elements respectively secured to said central unit and the associated one of said outer back rest units, and a torsion rod operatively connected to said tubular elements to yieldably resist relative rotation of said tubular elements in a predetermined direction.

7. The vehicle seat defined in claim 6 wherein said torsion rod assembly comprises means for selectively adjusting the tension applied to said torsion rod and including a manually manipulated member operatively connected to said torsion rod for accomplishing the tension adjustment thereof, said manually manipulatable member being disposed for ready access at the side of its associated outer back rest unit facing away from said central unit.

8. The vehicle seat defined in claim 6 comprising stop abutment means limiting relative rotation of said tubular elements in a predetermined direction where the associated one of said outer back rest units is located in substantially upright riding position.

9. In a vehicle seat, a back rest assembly comprising a fixedly mounted member, at least one back rest unit disposed on one side of said member, and a torsion rod assembly carried by said member supporting said back rest unit for pivotable movement about a substantially horizontal axis, said torsion rod assembly being operably connected to said back rest unit to continuously and yieldably resist forward pivotal movement of said back rest unit.

10. The vehicle seat defined in claim 9 comprising means cantilever supporting said torsion rod assembly on said member with said back rest unit being supported solely on said torsion rod assembly.

11. The vehicle seat defined in claim 3 wherein each of said back rest members is provided with a contoured cushion segmentally forming said surface of said back rest and a frame mounting said cushion in place, and wherein said means cantilever supporting each of said spaced back rest members comprises a torsion rod assembly, said torsion rod assembly comprising a pair of telescoping relatively rotatable tubular elements with one of said tubular elements being fixed secured to the frame of said central back rest member and the other of said tubular elements being fixedly secured to the frame of the associated one of said outer back rest members, a torsion rod operatively interconnecting said tubular elements to yieldably resist relative rotation of said tubular elements in a predetermined direction, and means for selectively adjusting the tension applied to said torsion rod.

References Cited in the file of this patent
UNITED STATES PATENTS

| | | |
|---|---|---|
| 1,765,394 | Atwood | June 24, 1930 |
| 2,288,535 | Marx | June 30, 1942 |
| 2,633,185 | Emberson | Mar. 31, 1953 |
| 2,767,775 | Nelson | Oct. 23, 1956 |
| 2,931,426 | Brueder | Apr. 5, 1960 |
| 2,936,823 | Neely | May 17, 1960 |

UNITED STATES PATENT OFFICE
CERTIFICATE OF CORRECTION

Patent No. 3,114,576

December 17, 1963

Elmer A. Herider et al.

It is hereby certified that error appears in the above numbered patent requiring correction and that the said Letters Patent should read as corrected below.

Column 6, line 68, for "manipulated" read -- manipulatable --; column 8, line 4, for "fixed" read -- fixedly --.

Signed and sealed this 5th day of May 1964.

(SEAL)
Attest:
ERNEST W. SWIDER

Attesting Officer

EDWARD J. BRENNER
Commissioner of Patents